United States Patent
Izumi et al.

(10) Patent No.: US 7,508,975 B2
(45) Date of Patent: Mar. 24, 2009

(54) IMAGE SENSOR

(75) Inventors: Daisaku Izumi, Kanagawa (JP); Tsutomu Haruta, Kanagawa (JP); Eiji Makino, Kanagawa (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 11/166,329

(22) Filed: Jun. 24, 2005

(65) Prior Publication Data

US 2006/0007331 A1    Jan. 12, 2006

(30) Foreign Application Priority Data

Jun. 28, 2004   (JP)   ............................ P2004-189207

(51) Int. Cl.
*G06K 9/00*   (2006.01)
(52) U.S. Cl. ...................................... 382/149
(58) Field of Classification Search ......... 382/141–149, 382/254, 270, 274, 309, 310, 312–318; 348/246
See application file for complete search history.

(56) References Cited

U.S. PATENT DOCUMENTS

| | | | | |
|---|---|---|---|---|
| 6,118,846 A * | 9/2000 | Liu | ............................... | 378/62 |
| 7,106,912 B2 * | 9/2006 | Kokubo et al. | ............... | 382/274 |
| 7,133,072 B2 * | 11/2006 | Harada | ........................ | 348/243 |
| 7,286,179 B2 * | 10/2007 | Chen et al. | ................... | 348/346 |
| 7,372,484 B2 * | 5/2008 | Mouli | ...................... | 348/222.1 |
| 2002/0005904 A1 * | 1/2002 | Mendis | ......................... | 348/246 |
| 2002/0145672 A1 * | 10/2002 | Mentzer | ..................... | 348/246 |
| 2002/0176013 A1 * | 11/2002 | Itoh | ............................ | 348/243 |
| 2004/0169746 A1 * | 9/2004 | Chen et al. | ................... | 348/246 |
| 2004/0263648 A1 * | 12/2004 | Mouli | ......................... | 348/243 |
| 2007/0285536 A1 * | 12/2007 | Post | ............................ | 348/247 |

* cited by examiner

*Primary Examiner*—Daniel G Mariam
(74) *Attorney, Agent, or Firm*—Sonnenschein Nath & Rosenthal LLP

(57) ABSTRACT

An image sensor is disclosed, which includes:
- a pixel unit having a plurality of pixels each outputting incident light as a pixel signal;
- an amplifier amplifying the pixel signal output from the pixel unit; and
- a defective pixel detection circuit performing a defective pixel detection on signals output from the amplifier, wherein
- the defective pixel detection circuit adjusts the detection accuracy of the defective pixel detection in accordance with an exposure condition of the pixel unit.

11 Claims, 9 Drawing Sheets

IMAGE SENSOR

CROSS REFERENCE TO RELATED APPLICATIONS

The present invention contains subject matter related to Japanese Patent Application JP 2004-189207 filed in the Japanese Patent Office on Jun. 28, 2004, the entire contents of which being incorporated herein by reference.

BACKGROUND OF THE INVENTION

1. Field of the Invention

This invention relates to an image sensor capable of detecting and correcting a defective pixel without having a storage unit for storing an address of the defective pixel.

2. Description of the Related Art

In a solid-state pickup element formed on a semiconductor substrate, such as a CMOS image sensor and a CCD (Charge Coupled Device) image sensor, a defective pixel is generated in some cases due to a local crystal defect and the like on the semiconductor substrate. Since a signal level output from such defective pixel is specific to the defective pixel and independent from an amount of incident light, quality of a picked up image can undesirably be deteriorated due to the signal output from the defective signal.

In an image pickup device of video cameras and digital cameras which have heretofore been used, a defective pixel existing in a solid-state image pickup element is detected, and address data and the like relating to the defective pixel are stored in a storage unit such as a nonvolatile memory, so that a signal output from the defective pixel is corrected based on the address data and the like of the defective pixel stored in the nonvolatile memory during image pickup.

For instance, in the case of the image pickup device provided with the CMOS image sensor, a lens of the image pickup device is light-shielded in a manufacturing stage, and a signal output from each of pixels of the image sensor is compared with a signal output from a pixel around a test pixel in a state where no light is incident to the CMOS image sensor to detect whether or not a difference between values of output levels of the signals exceeds a predetermined threshold value. The pixel outputting such specific signal output level is detected as a defective pixel.

Then, address data of the defective pixel are stored in a nonvolatile memory. After completion of the defective pixel detection, the CMOS image sensor is paired with the nonvolatile memory in which the address data of the defective pixel are stored and then incorporated in the image pickup device to be shipped. In the case where a user picks up images by the use of the image pickup device, a signal corresponding to the defective pixel in video signals output from the CMOS image sensor is corrected by a signal of a pixel in the vicinity of the defective pixel based on the address data of the defective pixel of the CMOS image sensor stored in the nonvolatile memory.

However, as described above, for the purpose of the correction of defective pixel in the solid-state image pickup element, the lens of the image pickup device is light-shielded to detect the defective pixel in the state where no light is incident to the CMOS sensor or the like, and the address data and the like of the defective pixel are stored in the memory in the manufacturing stage. Therefore, there has been a problem of an increase in process steps of the manufacturing stage. Also, it is difficult to correct a defective pixel of the CMOS image sensor generated by a spaceship irradiation after the shipping of the image pickup device which is provided with the CMOS image sensor.

As a countermeasure against such problems, for example, there has been disclosed a defect correction device correcting a defective pixel by: closing a diaphragm of a lens provided in an image pickup device at the time of inputting power to the image pickup device to establish a light-shielded state; detecting a defective pixel using a image pickup output signal of a solid-state image pickup element; recording defect data based on a detection signal from the defective pixel to retain the defect data; and by using the newest defective data during image pickup (see Patent Literature 1).

However, in this defect correction device, since address data and the like of the defective pixel are stored in a memory, it is necessary to provide a storage unit such as a memory for storing the address data of defective pixel in the image pickup device. There is another problem that the number of defective pixels to be corrected depends on memory capacity of the storage unit such as a nonvolatile memory storing the address data of defective pixels.

As a countermeasure against such problems, an automatic defect detection and correction device of a solid-state image pickup element, which detects and corrects a defective pixel generated after shipment without the provision of a storage unit such as a memory and an image pickup device using the same have been disclosed, for example (see Patent Literature 2).

[Patent Literature 1] JP-A-6-6685
[Patent Literature 2] JP-A-2002-223391

SUMMARY OF THE INVENTION

However, the image pickup device (Patent Literature 2), wherein a difference in signal level between the defective pixel and a plurality of pixels around the defective pixel are compared with a predetermined first defect detection threshold value and a predetermined second defect detection threshold value to convert the level of the signal output from the defective pixel into an average value of the pixels in the vicinity of the defective pixel, has a problem that an image quality deterioration such as flickering of the defective pixel may occur due to a repetition of judgments of detection/non-detection of defective pixels depending on values of the first and the second defect detection threshold values and a pickup condition of the image pickup device of the solid-state image pickup element.

This invention has been accomplished in view of the above-described circumstances, and it is desirable to provide an image sensor capable of suppressing an erroneous detection and an erroneous correction of a defective pixel without having a storage unit storing an address of defective pixel.

According to an embodiment of this invention, there is provided an image sensor provided with a pixel unit having a plurality of pixels each outputting a pixel signal, an amplifier amplifying the pixel signal output from the pixel unit to output the amplified pixel signal, and a defective pixel detection circuit performing a defective pixel detection on the signal output from the amplifier, wherein the defective pixel detection circuit adjusts an accuracy in detecting the defective pixel in accordance with an exposure condition of the pixel unit.

According to the image sensor, the defective pixel detection circuit adjusts the detection accuracy of the defective pixel detection in accordance with the exposure condition of the pixel unit. Therefore, the image sensor is advantageous in suppressing an erroneous detection and erroneous correction of defective pixel.

In order to suppress the erroneous detection and erroneous correction of defective pixel, a defective pixel detection circuit adjusting a detection accuracy of a defective pixel in accordance with an exposure condition of a pixel unit and a correction circuit correcting an amount of correction of a pixel signal of the defective pixel in accordance with the exposure conditions of the pixel unit are provided.

DESCRIPTION OF THE PREFERRED EMBODIMENTS

First Embodiment

Hereinafter, an image sensor according to a first embodiment of this invention will be described with reference to the drawings.

Figure 1:
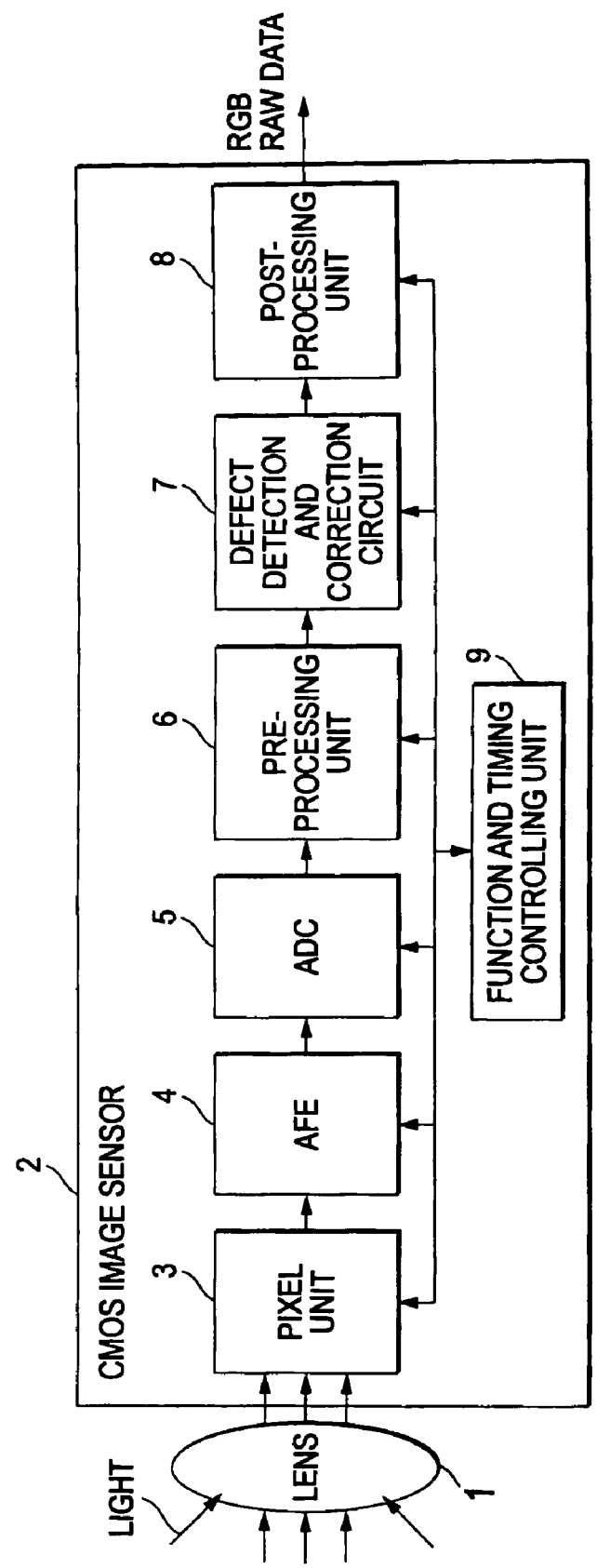
FIG. 1 is a diagram showing a configuration of an image sensor according to a first embodiment of this invention.

FIG. 1 is a diagram showing a configuration of the image sensor according to the first embodiment of this invention.

As shown in FIG. 1, the image sensor of the first embodiment is a CMOS image sensor 2, for example, which is a solid-state image pickup element. The image sensor 2 is used for converting light made incident through a lens 1 for forming an image of a subject of an image pickup device into pixel signals (electric signals) and provided with a pixel unit 3, an AFE (Analog Front End) 4, an ADC (Analog to Digital Converter) 5, a pre-processing unit 6, a defect detection and correction circuit 7 realizing a defective pixel detection and correction method of this invention, a post-processing unit 8, and a function and timing controlling unit 9.

The incident light obtained from the subject is input into the pixel unit 3 of the CMOS image sensor 2. The incident light is converted into electric signals in the pixel unit 3 to be input to the AFE 4. The input electric signals undergo a correlation double sampling (CDS) and an auto gain control (AGC) in the AFE 4 to be output from the AFE 4. The electric signals output from the AFE 4 undergo A/D conversion in the ADC 5 to be output as digital signals. The digital signals undergo various digital processings in the pre-processing unit 6 to be output from the pre-processing unit 6. In the case where a defective pixel signal is included in the digital signals, the defective pixel signal is corrected by the defective pixel detection and correction method of this invention in the defect detection and correction circuit 7 to be output as a corrected digital signal. The digital signals are then input to the post-processing unit 8 to undergo various digital processings to be output from the post-processing unit 8. The digital signals are output signals of the CMOS image sensor 2. In addition, the function and timing controlling unit 9 controls the components of the CMOS image sensor 2.

Figure 2:
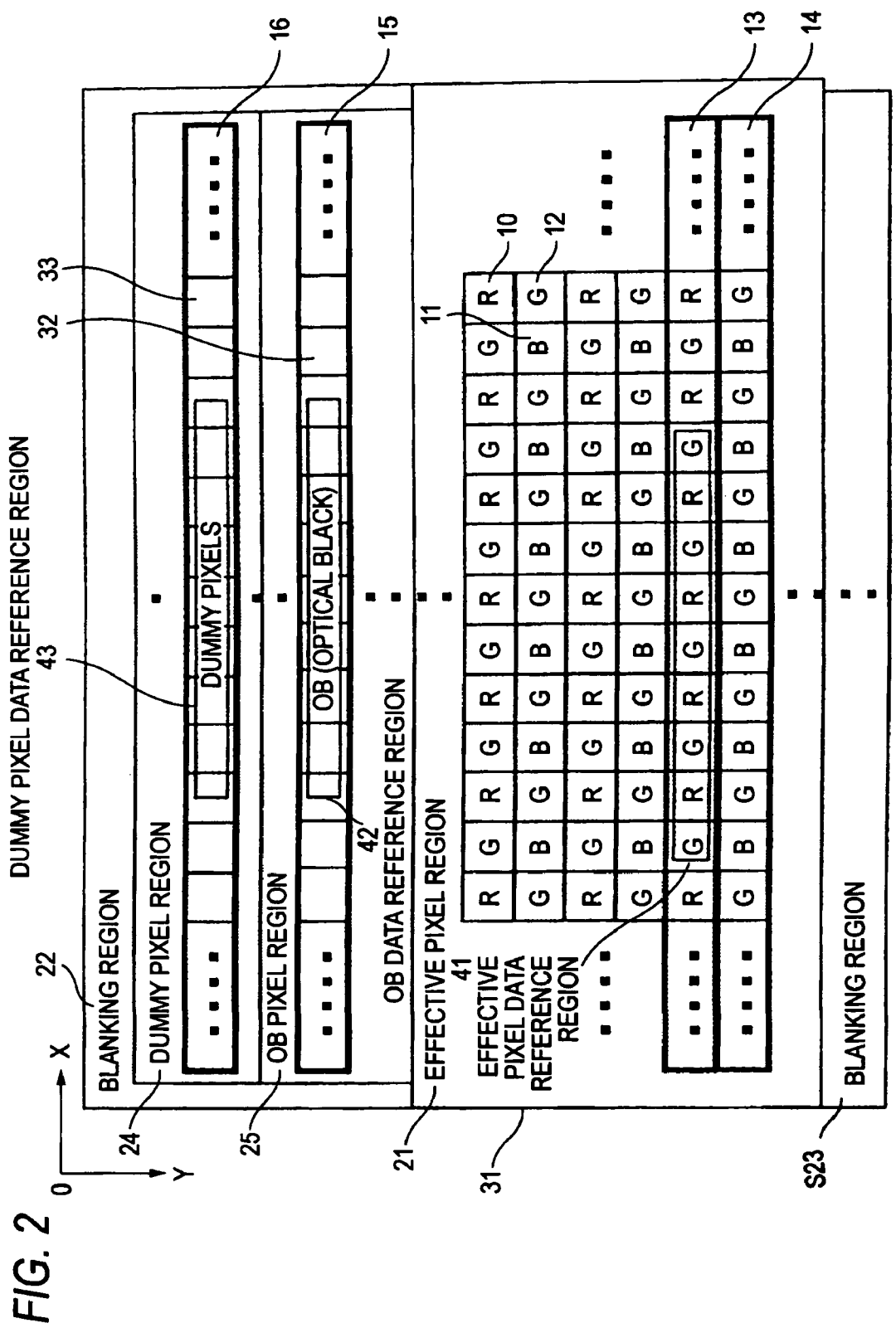
FIG. 2 is a diagram showing a configuration of a pixel unit 3 shown in FIG. 1.

FIG. 2 is a diagram showing a configuration of the pixel unit 3 shown in FIG. 1.

As shown in FIG. 2, the pixel unit 3 is provided with an effective pixel region 21 having a plurality of effective pixels 31 each having a color filter of R, G, or B and blanking regions 22 and 23. Each of the blanking regions 22 and 23 is provided with an OB pixel region 24 having a plurality of OB (Optical Black) pixels 32 and a dummy pixel region 25 having a plurality of dummy pixels 33.

Each of the effective pixels 31 of the effective pixel region 21 is indicated as a R (red) transmitting filter pixel 10, a B (blue) transmitting filter pixel 11, or a G (green) transmitting filter pixel 12. The R transmitting filter pixel 10 and the G transmitting filter pixel 12 are alternated in a horizontal direction (direction X) in a first filter array 13, and the G transmitting filter pixel 12 and the B transmitting filter pixel 11 are alternated in the horizontal direction in a second filter array 14. The first filter array 13 and the second filter array 14 are alternated in a vertical direction (direction Y). The G transmitting filter pixel 12 of the first filter array 13 and the G transmitting filter pixel 12 of the second filter array 14 are so arranged as not to be repeated in the vertical direction. The filter arrangement is generally used as the Bayer arrangement.

Also, a defective pixel may be included in an OB array 15 in which the OB pixels 32 are in a light-shielded state, as is the case with the effective pixels 31 having the RGB filters. No defect exists in a dummy pixel array 16. These pixel outputs are executed in the order of the dummy pixel arrays 16, the OB arrays 15, and the alternated first filter arrays 13 and second filter arrays 14. The defect detection and correction processing is performed on the OB arrays 15 and the plural lines of the effective pixel region 21.

Figure 3:
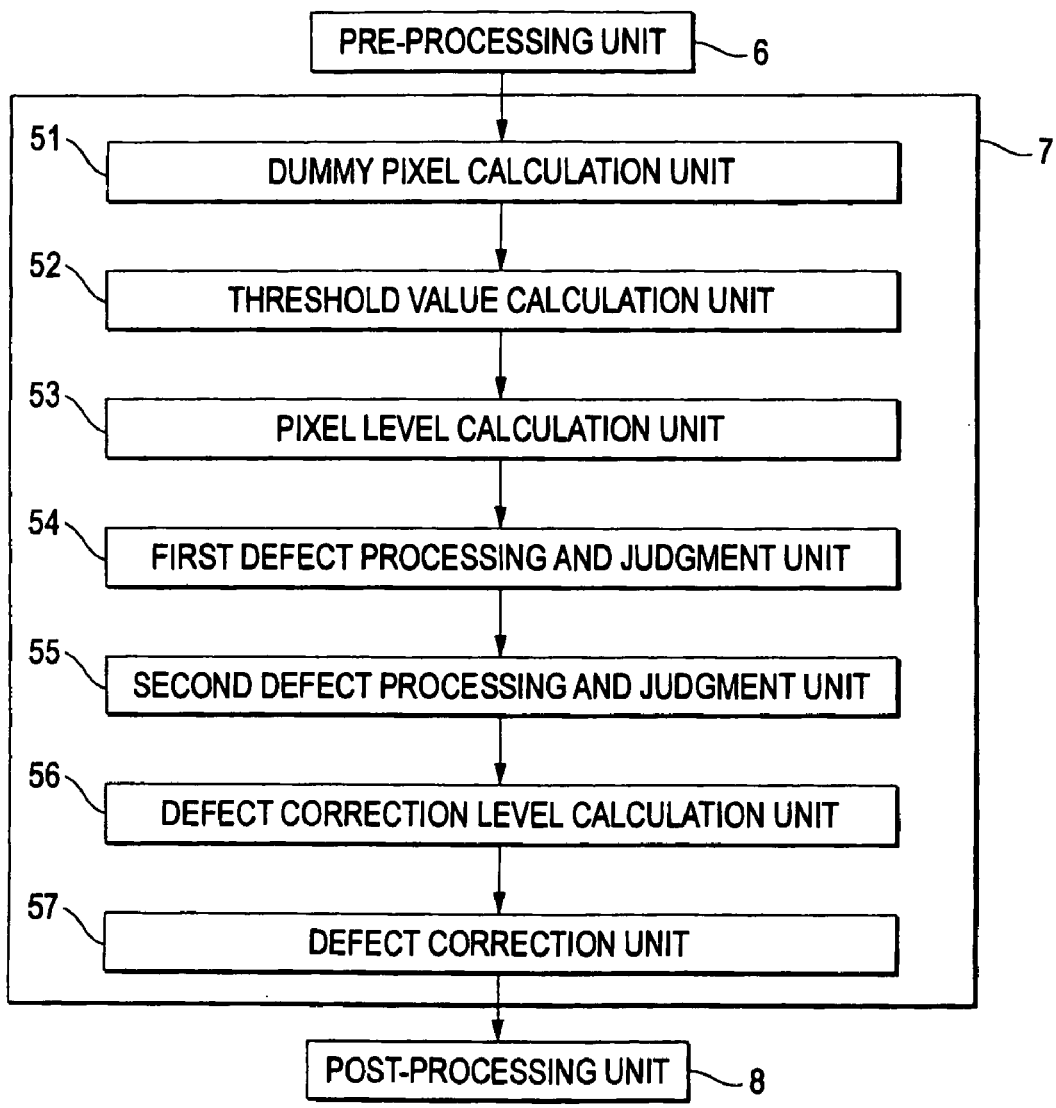
FIG. 3 is a diagram showing a structure of a defect detection and correction circuit 7 shown in FIG. 1.

FIG. 3 is a diagram showing a configuration of the defect detection and correction circuit 7 shown in FIG. 1.

As shown in FIG. 3, the defect detection and correction circuit 7 has a dummy pixel calculation unit 51, a threshold value calculation unit 52, a pixel level calculation unit 53, a first defect processing and judgment unit 54, a second defect processing and judgment unit 55, a defect correction level calculation unit 56, and a defect correction unit 57.

The dummy pixel calculation unit 51 performs processing of Steps S1 to S3 in a flowchart which will be described later in this specification and shown in FIG. 4. The threshold value calculation unit 52 performs processing of Step 4 in the flowchart of FIG. 4. The pixel level calculation unit 53 performs processing of Steps S5 and S6 in the flowchart of FIG. 4. The first defect processing and judgment unit 54 performs processing of Step S7 in the flowchart of FIG. 4. The second defect processing and judgment unit 55 performs processing of Step S8 in the flowchart of FIG. 4. The defect correction level calculation unit 56 performs processing of Step S9 in the flowchart of FIG. 4. The defect correction unit 57 performs processing of Step S10 in the flowchart of FIG. 4.

Figure 4:
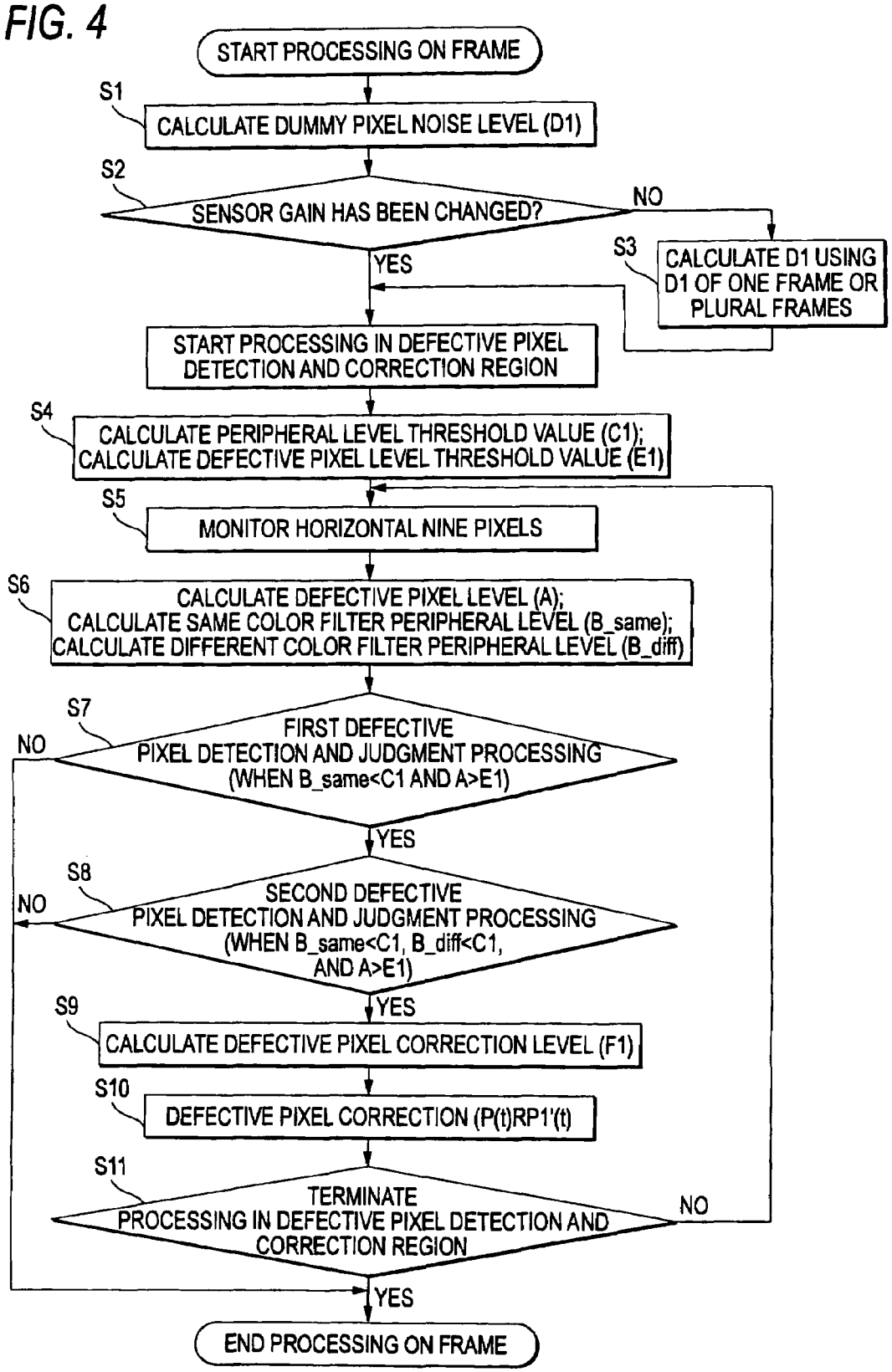
FIG. 4 is a flowchart showing defect detection and correction processing according to the first embodiment.

FIG. 4 is a flowchart showing the defect detection and correction processing of the first embodiment.

Hereinafter, there will be described by way of example a case wherein the central pixel of a data reference region 41 of the effective pixels 31 is a noted pixel which is a subject for a detection of defective pixel and there are ±2 same color filter horizontal pixels and ±2 different color filter horizontal pixels.

Referring to FIG. 4, the dummy pixels 33 in a dummy pixel data reference region 43 of FIG. 2 is referred to, and then a dummy pixel noise level (D1) is calculated by way of a difference value between a maximum value and a minimum value of the dummy pixels 32. A portion set as the dummy pixel data reference region 43 may be a part of or whole of the dummy pixel region 24 (Step S1).

After that, it is confirmed whether or not a gain in the AFE 4 shown in FIG. 1 and a gain in the pre-processing unit 6 have been changed from those of a precedent frame (Step S2).

When it is confirmed that no change has been made to the gains in Step S2, the dummy pixel noise level (D1) calculated in the precedent frame is added to obtain an average value, thereby performing an arithmetic processing for increasing an accuracy of the dummy pixel noise level (D1) (Step S3). More specifically, though this arithmetic processing is always performed in the case where no change has been made to the gains, the arithmetic processing can be terminated after being performed for only one frame or a plurality of frames. After the arithmetic processing, the arithmetic processing for the dummy pixels 32 of FIG. 2 is brought to an end.

In turn, when a change has been made to the gains, the arithmetic processing for the dummy pixels 33 is brought to an end in Step S3 when it is confirmed that the change has been made.

A defect detection and correction region includes the effective pixel region 21 and the OB pixel region 22 of FIG. 2. Data to be input to the defect detection and correction circuit 7 of FIG. 1 realizing the automatic defective pixel detection and correction method of the first embodiment are input in the order of the data for the OB pixel region 22 and the data for the effective pixel region 21.

Next, a peripheral level threshold value (C1) and a defective pixel level threshold value (E1) are calculated. The peripheral level threshold value (C1) and the defective pixel level threshold value (E1) obtained in the case where the data of the OB pixel region 22 are input are the same as or different from those obtained in the case where the data of the effective pixel region are input. In other words, it is possible to perform defect detection processing on a defective pixel in the OB pixel region 22 and defect detection processing on a defective pixel in the effective pixel region 21 at identical or different defective pixel detection sensitivities. Also, the peripheral level threshold value (C1) and the defective pixel level threshold value (E1) are calculated before the outputs of the OB pixel region 22 and the effective pixel region 21 are input to the defect detection and correction circuit 7 of FIG. 1.

The peripheral level threshold value (C1) is calculated from the dummy pixel noise level (D1) calculated in Step S1 and a defect detection coefficient (X1). It is possible to set a predetermined value or a value dependent on a sensor gain and a sensor accumulation period as the defect detection coefficient (X1), and it is possible to vary a defect detection coefficient for the OB pixel region 22 from a defect detection coefficient for the effective pixel region 21. Thanks to the capability of varying the defect detection coefficient (X1) for the OB pixel region 22 from that for the effective pixel region 21, it is possible to perform the defect detection processing on the defective pixels in the OB pixel region 22 and the defect detection processing on the defective pixels in the effective pixel region 21 at identical or different defective pixel detection sensitivities. With the defect detection coefficient set to an arbitrary value, it is possible to perform the defect detection processing at an arbitrary defective pixel detection sensitivity (Step S4).

Figure 5:
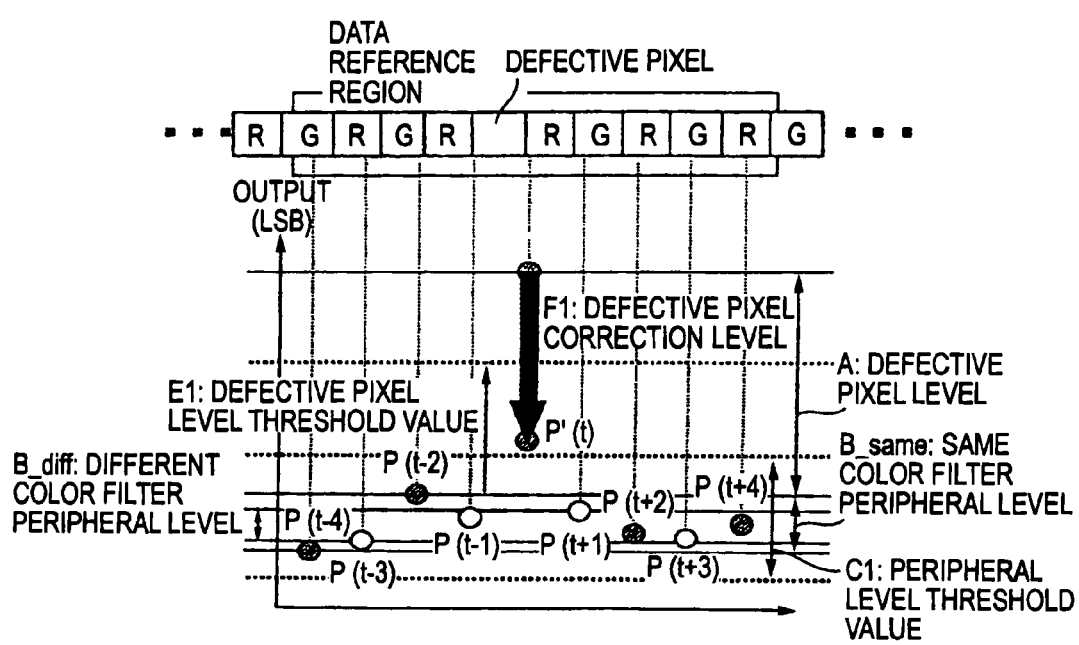
FIG. 5 is a diagram showing data reference region and parameters.

FIG. 5 is a diagram showing the data reference region 41 of arbitrary horizontal nine pixels in the OB pixel region 22 and the effective pixel region 21 of FIG. 2 as well as definitions of parameters used for the defect detection and correction processing (the effective pixel region 21 is shown in FIG. 5 by way of example).

The parameters are defined as follows:

P(t) is an output value of the central pixel in the data reference region;

A is a defective pixel level;

A=P(t)−max{P(t−4), P(t−2), P(t+2), P(t+4)} when the defective pixel exhibits a higher level as compared with peripheral pixels;

A=|P(t)−min{P(t−4), P(t−2), P(t+2), P(t+4)}| when the defective pixel exhibits a lower level as compared with peripheral pixels;

B_same is a same color filter peripheral level;

B_same=max{P(t−4), P(t−2), P(t+2), P(t+4)}−min{P(t−4), P(t−2), P(t+2), P(t+4)};

B_diff is a different color filter peripheral level;

B_diff=max{P(t−3), P(t−1), P(t+1), P(t+3)}−min{P(t−3), P(t−1), P(t+1), P(t+3)};

C1 is a peripheral level threshold value;

C1=X1×D1;

D1 is a dummy pixel noise level;

D1=max{dummy pixel reference region}−min{dummy pixel reference region};

E1 is a defective pixel level threshold value;

E1 depends on Gain;

E1 depends on an exposure period;

E1 for the OB pixel region 22 and E1 for the effective pixel region 21 are the same or different from each other;

F1 is a defective pixel correction level;

F1=A−E1;

P1'(t) is an output value of a defective pixel after defective pixel correction;

X1 is a defective pixel coefficient;

E1 depends on Gain;

E1 depends on an exposure period; and

E1 for the OB pixel region 22 and E1 for the effective pixel region 21 are the same or different from each other.

Referring back to FIG. 4, in the case of the effective pixel region 21: the central pixel in the data reference region 41 (shown in FIG. 5 is the case of the G transmitting filter pixel 12 of FIG. 2) is a noted pixel; an output value of the noted pixel is P(t); output values of second adjacent pixels of the noted pixel are P(t−2) and P(t+2); and output values of fourth pixels from the noted pixel are P(t−4) and P(t+4). The horizontal five pixels P(t−4), P(t−2), P(t), P(t+2), and P(t+4) are monitored. The horizontal five pixels are pixel outputs of same color transmitting filters (G transmitting filter pixels 12 in the case of FIG. 5). Also, in the case where output values of adjacent pixels of the noted pixel are P(t−1) and P(t+1) and output values of third pixels from the noted pixel are P(t−3) and P(t+3), the horizontal four pixels are pixel outputs of same color transmitting filters of which the color is different from that of the noted pixel (R transmitting filter pixels 10 in the case of FIG. 5). Note that the data for OB pixel region 22 are free from the question of same color filters or different color filters since the data are light-shielded pixel outputs (Step S5).

The defective pixel level (A) is calculated from a difference value between P(t) and a maximum value of the P(t−4), P(t−2), P(t+2), and P(t+4) in the case where the level of P(t) is higher than those of P(t−4), P(t−2), P(t+2), and P(t+4) or calculated from an absolute value of a difference value between P(t) and a minimum value of P(t−4), P(t−2), P(t+2), and P(t+4) in the case where the level of P(t) is lower than those of P(t−4), P(t−2), P(t+2), and P(t+4).

The same color filter peripheral level (B_same) is calculated as a difference value between the maximum value and the minimum value of P(t−4), P(t−2), P(t+2), and P(t+4), and the difference color filter peripheral level (B_diff) is calculated as a difference value between a maximum value and a minimum value of P(t−3), P(t−1), P(t+1) and P(t+3) (Step S6).

The defect detection and judgment processing will be performed next, but, depending on settings, it is possible to select either one of the first defect detection and judgment processing and the second defect detection and judgment processing. The processings are described below.

The first defect detection and judgment processing is performed by using the defective pixel level (A), the same color filter peripheral level (B_same), the peripheral level threshold value (C1), and the predetermined defective pixel level threshold value (E1). The second defect detection and judgment condition is such that the noted pixel is judged to be defective when the defective pixel level (A) is larger than the defective pixel level threshold value (E1) and, at the same time, only the same color filter peripheral level (B_same) is smaller than the peripheral level threshold value (C1). The defective correction processing described below is performed when the noted pixel is judged to be defective (Step S7).

In the case where the first defect detection and judgment condition is not satisfied in Step S7, the defect detection processing in the current data reference region is terminated to confirm whether or not (the processing in) the defect detection and correction region has been terminated (Step S11).

In turn, in the case where the first defect detection and judgment condition has been satisfied in Step S7, the process proceeds to the second defect detection and judgment processing. The second defect detection and judgment processing is performed by using the defective pixel level (A), the same color filter peripheral level (B_same), the different color filter peripheral level (B_diff), the peripheral level threshold value (C1), and the predetermined defective pixel level threshold value (E1). The first defect detection and judgment condition is such that the noted pixel (central pixel in the data reference region) is judged to be defective when the defective pixel level (A) is larger than the defective pixel level threshold value (E1) and, at the same time, the same color filter peripheral level (B_same) and the different color filter peripheral level (B_diff) are smaller than the peripheral level threshold value (C1) (Step S8).

Since the monitoring is performed on not more than the horizontal nine pixels in the first and the second defect detections and judgments, an erroneous detection/correction of a vertical or oblique line may occur in the case where a letter or a line of a high resolution is picked up by the use of a lens of a high resolution.

In the first defect detection and judgment, since a unicolor vertical line and a unicolor oblique line can be erroneously detected/corrected and the monitoring is performed only on the same color filters, a vertical line and an oblique line each of which is composed of plural colors, such as a white line, can be erroneously detected/corrected to be changed into a different color array. However, a flickering frequency of defective pixel near the edge is low.

In the second defect detection and judgment, the unicolor (red, blue, or green) vertical and oblique lines can be erroneously detected/corrected as is the case in the first defect detection and judgment. Though it is possible to avoid the erroneous detection/correction of the vertical and oblique lines each of which is composed of plural colors, such as a white line, in the second defect detection and judgment, the flickering frequency of defective pixel near the edge (a boundary between a high level output and a low level output) may be increased due to the monitoring on the different color filters.

It is possible to avoid the erroneous detection and correction of vertical and oblique lines by monitoring simultaneously plural pixels arranged vertically and obliquely with respect to the noted pixel in the above-described defect detection and correction processing; however, such defect detection and correction processing uses plural line memories as CMOS image sensors for monitoring the vertical and oblique pixel outputs simultaneously, thereby undesirably increasing the size of the circuit.

In the case where the first and the second defect detection and judgment conditions are satisfied in Steps S7 and S8, the defect correction level (F1) is calculated. The defect correction level (F1) is calculated as a difference value between the defective pixel level (A) and the defective pixel level threshold value (E1). Defective pixel flickering may occur in an output image due to alternated defective pixel correction/non-correction processings performed when the defective pixel level (A) of the defective pixel is substantially identical to the defective pixel level threshold value (E1); however, this arithmetic processing achieves an effect of suppressing the flickering. A defect correction ability is increased with an increase in ratio of the defective pixel level (A) to the defective pixel level threshold value (E1), while the minimal correction is performed when the defective pixel level (A) is substantially identical to the OB defective pixel level threshold value (E1) (Step S9).

Next, the output value P (t) of the noted pixel which has been judged to be the defective pixel is converted into an output value P1'(t) of defective pixel after defective pixel correction. The output value P1'(t) of defective pixel after defective pixel correction is calculated as a difference value between P(t) and the defect correction level (F1) in the case where the output value P(t) of noted pixel is larger than P(t−4), P(t−2), P(t+2), and P(t+4). Note that the output value P1'(t) of defective pixel after defective pixel correction is corrected to be the maximum value or the average value of P(t−4), P(t−2), P(t+2), and P(t+4) to the utmost in this case.

Also, in the case where the output value P(t) of noted pixel is smaller than P(t−4), P(t−2), P(t+2), and P(t+4), the output value P1'(t) of defective pixel after defective pixel correction is calculated as a sum of P(t) and the defective correction level (F1). Note that the output value P1'(t) of defective pixel after defective pixel correction is corrected to be the minimum value or the average value of P(t−4), P(t−2), P(t+2), and P(t+4) to the utmost in this case. Therefore, it is possible to correct both of the defective pixel having remarkably higher level and the defective pixel having remarkably low level with respect to the peripheral pixels by switching between the summing and the subtraction (Step S10).

Then, it is confirmed whether or not (the processing in) the defect detection correction region has been terminated (Step S11). In the case where (the processing) has not been terminated, the defect detection and correction processing is performed on subsequent outputs. Upon termination of (the processing in) the defect detection correction region, the above-described defect detection and correction processing is performed on a subsequent frame.

Second Embodiment

Figure 6:
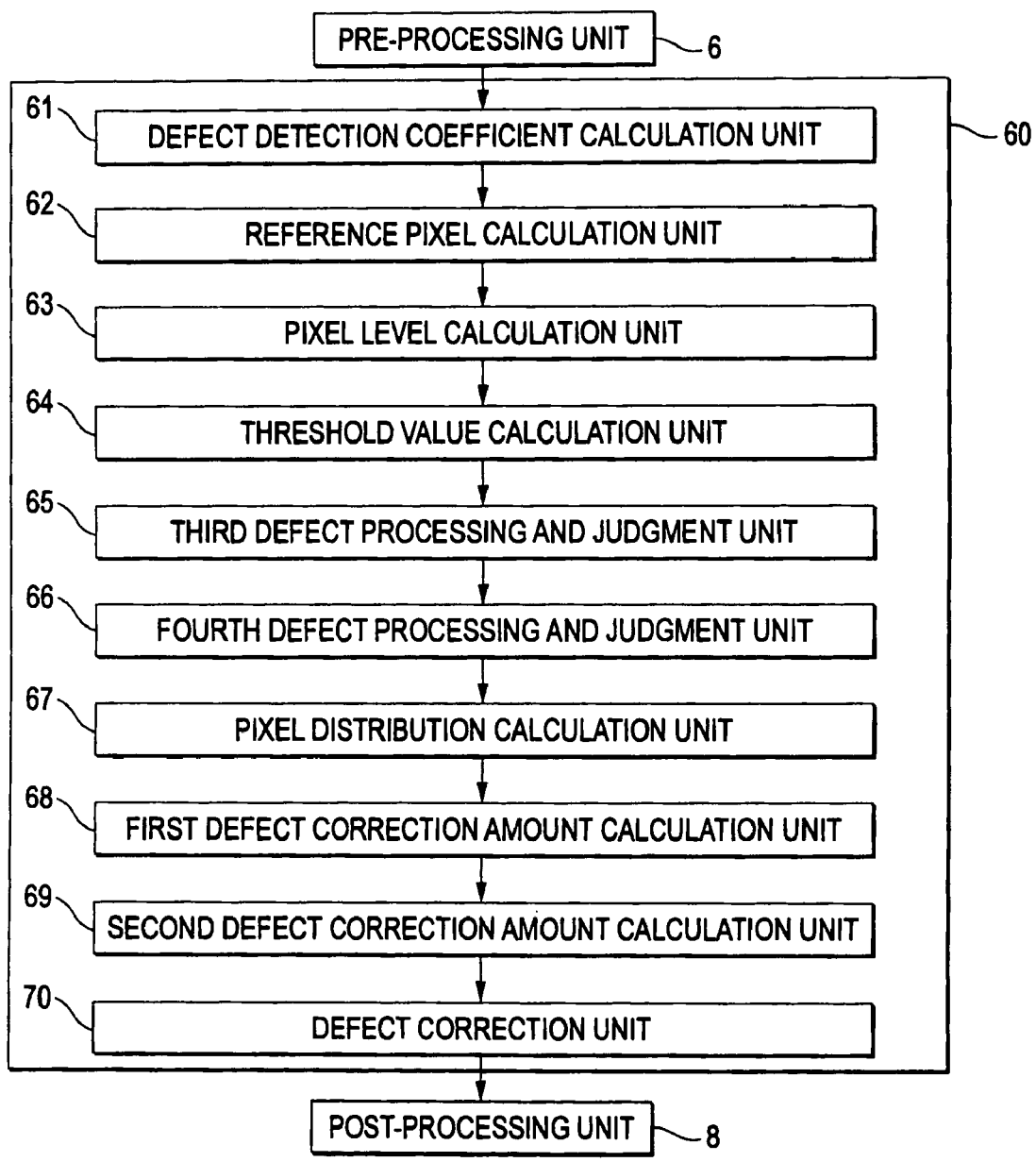
FIG. 6 is a diagram showing a configuration of a defect detection and correction circuit of an image sensor according to a second embodiment.

FIG. 6 is a diagram showing a configuration of a defect detection and correction circuit of an image sensor according to a second embodiment.

As shown in FIG. 6, the image sensor of the second embodiment is the same as the CMOS image sensor 2 of the first embodiment except for using the defect detection and correction circuit 60 in place of the defect detection and correction circuit 7. Other components are the same as those of the CMOS image sensor 2 of the first embodiment, and descriptions thereof are omitted.

The defect detection and correction circuit 60 has a defect detection coefficient calculation unit 61, a reference pixel calculation unit 62, a pixel level calculation unit 63, a threshold value calculation unit 64, a third defect processing and judgment unit 65, a fourth defect processing and judgment unit 66, a pixel distribution calculation unit 67, a first defect correction amount calculation unit 68, a second defect correction amount calculation unit 69, and a defect correction unit 70.

The defect detection coefficient calculation unit 61 performs processing of Step S21 in a flowchart shown in FIGS. 7 and 8 described later in this specification. The reference pixel calculation unit 62 performs processing of Steps S22 and S23 in the flowchart of FIGS. 7 and 8. The pixel level calculation unit 63 performs processing of Step S24 in the flowchart of FIGS. 7 and 8. The threshold value calculation unit 64 performs processing of Step S25 in the flowchart of FIGS. 7 and 8. The third defect processing and judgment unit 65 performs processing of Step S26 in the flowchart of FIGS. 7 and 8. The fourth defect processing and judgment unit 66 performs processing of Step S27 in the flowchart of FIGS. 7 and 8. The pixel distribution calculation unit 67 performs processing of Step S28 in the flowchart of FIGS. 7 and 8. The first defect correction amount calculation unit 68 performs processing of Steps S29 to S32 in the flowchart of FIGS. 7 and 8. The second defect correction amount calculation unit 69 performs processing of Steps S35 to S38 in the flowchart of FIGS. 7 and 8. The defect correction unit 70 performs processing of Step S33 in the flowchart of FIGS. 7 and 8.

Figure 7:
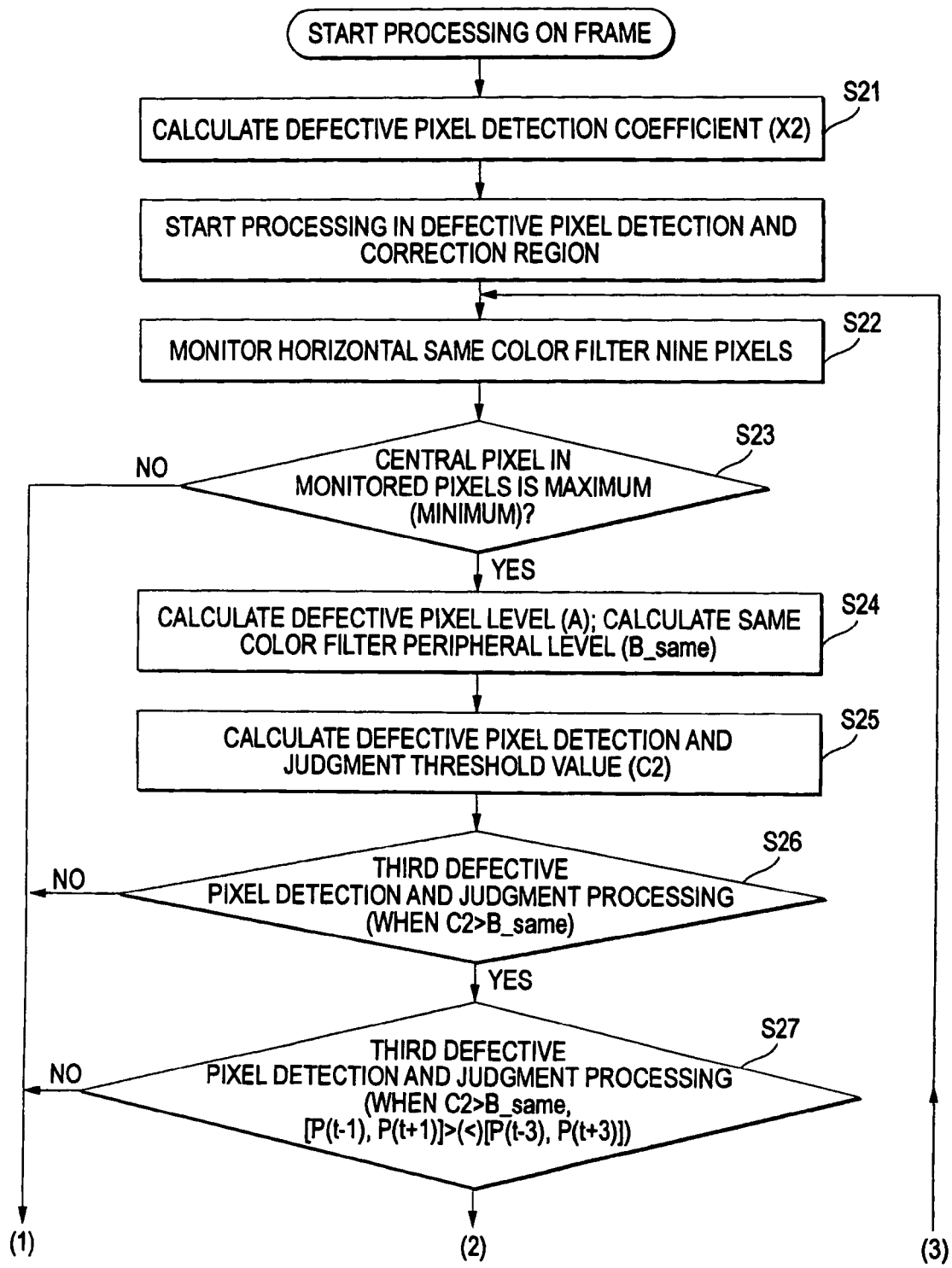
FIG. 7 is a part of a flowchart showing defect detection and correction processing according to the second embodiment.
Figure 8:
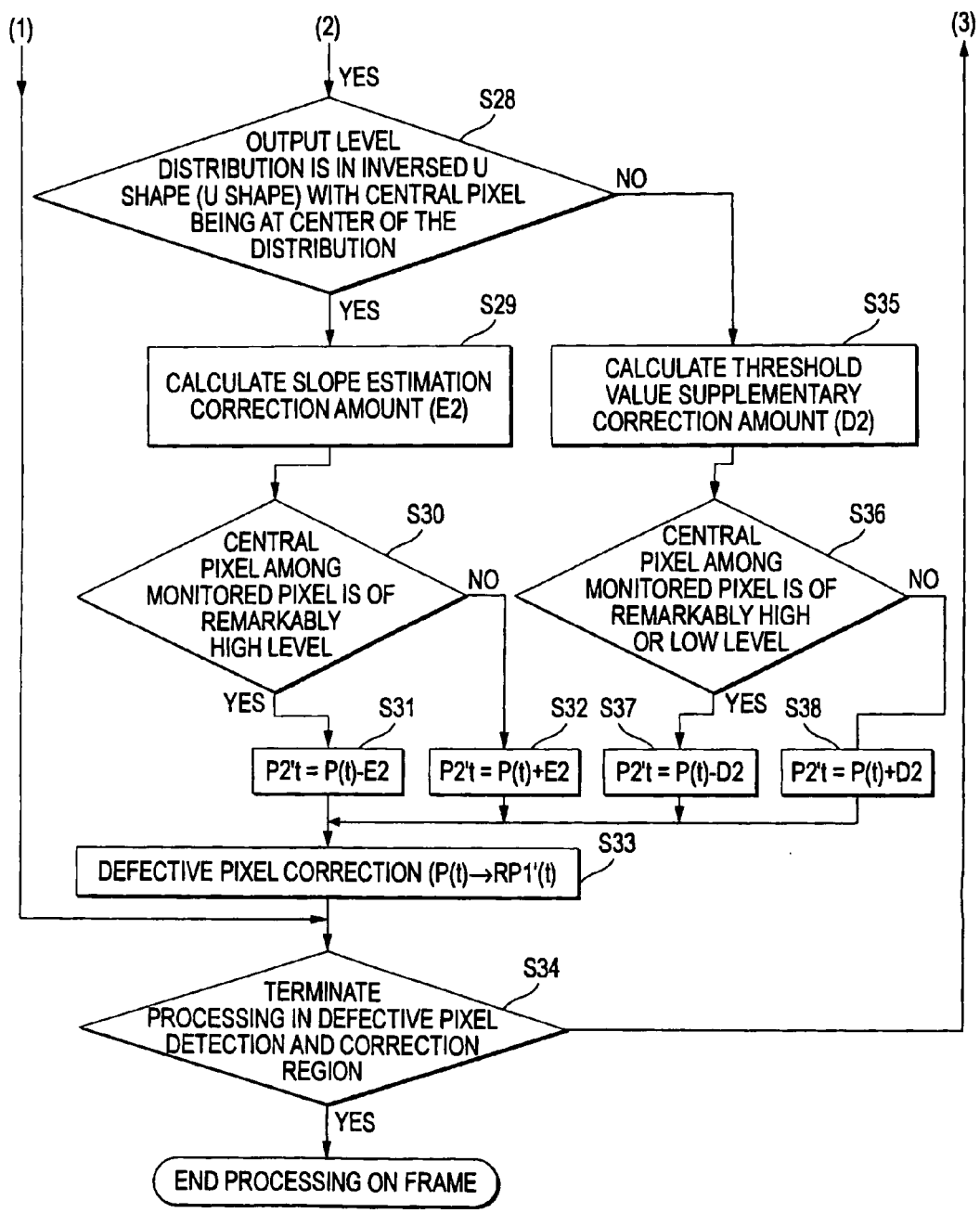
FIG. 8 is the other part of the flowchart showing the defect detection and correction processing according to the second embodiment.

Shown in FIGS. 7 and 8 is the flowchart showing defect detection and correction processing of the second embodiment.

Referring to FIGS. 7 and 8, calculation processing of a defect detection coefficient (X2) is performed before outputs of the OB pixel region 22 and the effective pixel region 21 of FIG. 2 are input to the defect detection and correction circuit 60 of FIG. 6, so that different values or an identical value can be referred to for the defect detection in the OB pixel region 22 and the defect detection in the effective pixel region 21 in the case of the defect detection and correction processing. With this processing, it is possible to detect the defective pixels with a defective pixel detection sensitivity being varied according to the OB pixel region 22 and the effective pixel region 21.

Further, the defect detection coefficient (X2) can be a value obtained by automatically calculating a value which depends on gain settings of the pre-processing unit 6 of FIG. 1 and gain settings of the AFE 4 of FIG. 1, a value which is a predetermined value set for the arbitrary gain, or a value which is set arbitrarily and externally (Step S21).

Figure 9:
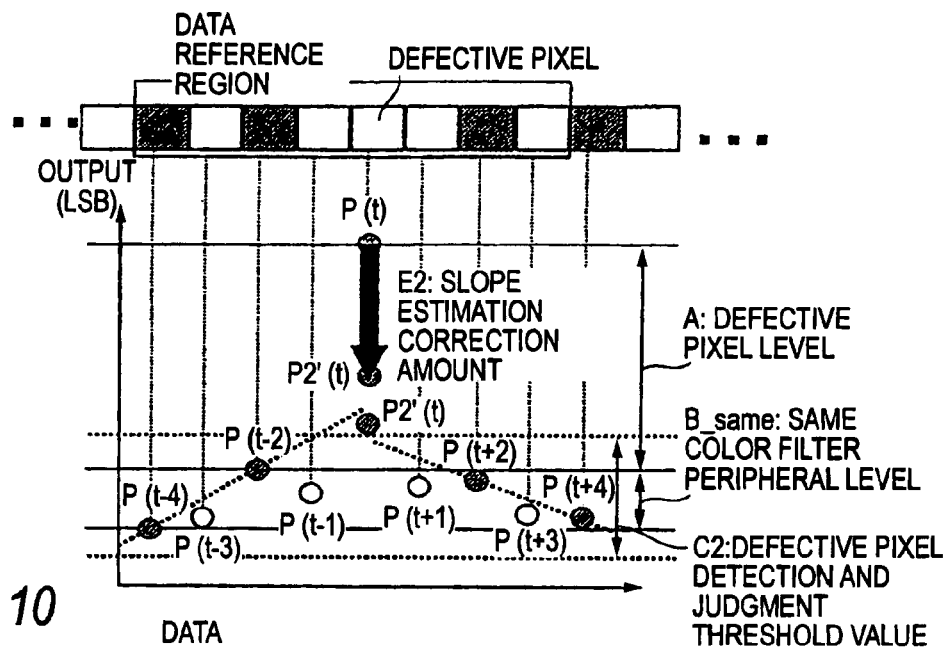
FIG. 9 is a diagram showing data reference region and parameters in an output state 1.
Figure 10:
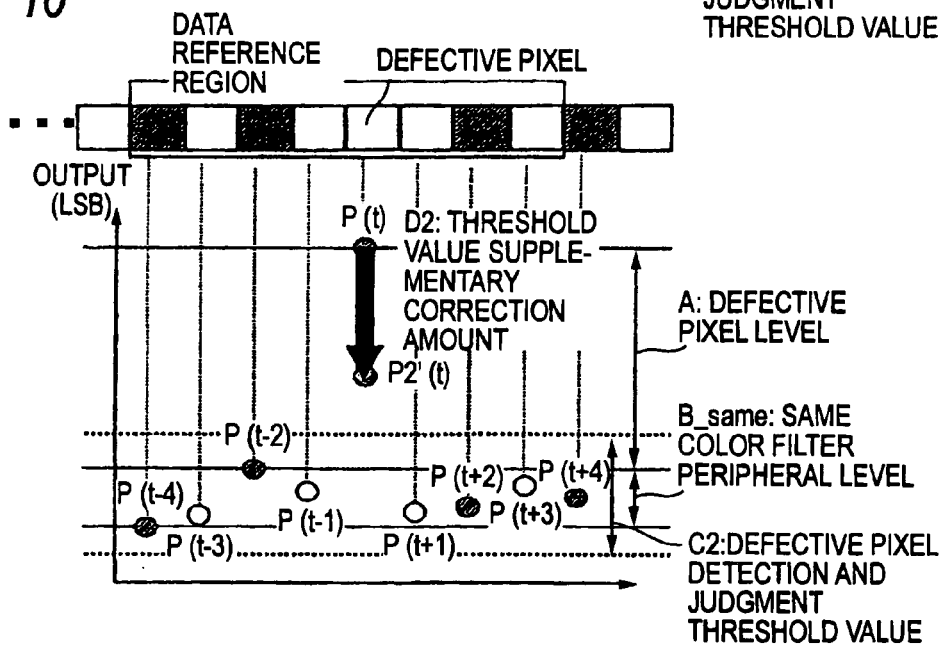
FIG. 10 is a diagram showing data reference region and parameters in an output state 2.

Shown in FIGS. 9 and 10 is a data reference region 41 of arbitrary horizontal nine pixels of the OB region 22 and the effective pixel region 21 of FIG. 2 as well as definitions of parameters used for the defect detection and correction processing of the second embodiment (The effective pixels 31 are used in FIGS. 9 and 10 by way of example).

The parameters are defined as follows:

P(t) is an output value of the central pixel in the data reference region;

A is a defective pixel level;

$A=P(t)-\max\{P(t-4), P(t-2), P(t+2), P(t+4)\}$ when the defective pixel exhibits a higher level as compared with peripheral pixels;

$A=|P(t)-\min\{P(t-4), P(t-2), P(t+2), P(t+4)\}|$ when the defective pixel exhibits a lower level as compared with peripheral pixels;

B_same is a same color filter peripheral level;

$B\_same=\max\{P(t-4), P(t-2), P(t+2), P(t+4)\}-\min\{P(t-4), P(t-2), P(t+2), P(t+4)\}$;

C2 is a defect detection and judgment threshold value;

$C2=A-X2$;

D2 is a threshold value supplementary correction amount;

$$D2 = C2 - B\_same = A - X2 - B\_same;$$

E2 is a slope estimation correction amount;

$E2=P(t)-P2(t)-X2$;

P2(t) is an output value of a defective pixel after slop estimation;

$P2(t)=\{(2\times(P(t-2)-P(t-4)))+(2\times(P(t+2)-P(t+4)))\}/2$;

P'2(t) is an output value of a defective pixel after defective pixel correction;

X2 is a defective pixel detection decay coefficient;

X2 depends on Gain (when Gain is large→X is small, when Gain is small→X is large); and X2 for the OB pixel region 22 and X2 for the effective pixel region 21 are the same or different from each other.

Referring back to FIGS. 7 and 8, when the central pixel in the data reference region is a noted pixel, an output value of the noted pixel is P(t); output values of second adjacent pixels of the noted pixel are P(t−2) and P(t+2); and output values of fourth pixels from the noted pixel are P(t−4) and P(t+4). The horizontal nine pixels P(t−4), P(t−2), P(t), P(t+2), and P(t+4) are monitored in this case. The horizontal five pixels are pixel outputs of same color transmitting filters (G transmitting filter pixels 12 in the case of FIGS. 9 and 10).

Also, in the case where output values of adjacent pixels of the noted pixel are P(t−1) and P(t+1) and output values of third pixels from the noted pixel are P(t−3) and P(t+3), the horizontal four pixels are pixel outputs of same color transmitting filters of which the color is different from that of the noted pixel (R transmitting filter pixels 10 in the case of FIGS. 8 and 9).

Difference between FIGS. 9 and 10 is as follows. Shown in FIG. 9 is an output state in which P(t) is larger than the four pixels P(t−4), P(t−2), P(t+2), and P(t+4), and the two pixels P(t−2) and P(t+2) are larger than P(t−4) and P(t+4) (hereinafter described as "output state 1"). Shown in FIG. 10 is one example of output states (hereinafter described as "output state 2") other than the output state 1 of FIG. 9 (Step S22).

Then, it is confirmed whether or not the output value P(t) of the noted pixel in the data reference region is larger (smaller) than the four pixels P(t−4), P(t−2), P(t+2), and P(t+4) of the color filters of which the color is the same as that the noted pixel in the data reference region (Step 23).

In the case where the above condition is not satisfied in Step S23, the defect detection and correction processing in the current data reference region is terminated to perform processing for confirming whether or not (the processing in) the defect detection and correction region has been terminated (Step S34).

In the case where the condition is satisfied in Step S23, the process proceeds to Step S24. The defective pixel level (A) is calculated from a difference value between P(t) and a maximum value of the P(t−4), P(t−2), P(t+2), and P(t+4) in the case where the level of P(t) is higher than those of P(t−4), P(t−2), P(t+2), and P(t+4). In turn, the defective pixel level (A) is calculated from an absolute value of a difference value between P(t) and a minimum value of P(t−4), P(t−2), P(t+2), and P(t+4) in the case where the level of P(t) is lower than those of P(t−4), P(t−2), P(t+2), and P(t+4). The same color filter peripheral level (B_same) is calculated as a difference value between the maximum value and the minimum value of P (t−4), P(t−2), P(t+2), and P(t+4) (Step S24).

Next, the defective pixel detection and judgment threshold value (C2) is calculated. The defective pixel detection and judgment threshold value (C2) is decided depending on the defective pixel level (A2) and the defect detection coefficient (X2). The defect detection coefficient (X2) has been calculated in Step S21 as described above. The defective pixel detection and judgment threshold value (C2) becomes large when the defective pixel level is large and becomes small when the defective pixel level is small in general.

Also, the defect detection coefficient (X2) becomes large when the gain in the AFE 4 of FIG. 1 and the gain in the pre-processing unit 6 of FIG. 1 are small and becomes small when the gain in the AFE 4 of FIG. 1 and the gain in the pre-processing unit 6 of FIG. 1 are large.

That is, readiness in detecting the defective pixel is increased when the defective pixel level of the defective pixel and the sensor gain are large and reduced when the defective pixel level of the defective pixel and the sensor gain are small.

With such processing, it is possible to reduce or eliminate an erroneous detection frequency of a vertical line and an oblique line when the sensor gain is small and image quality is high, and it is possible to correct a high level defective pixel without fail when the sensor gain is large and noise is large to a certain degree.

However, it is difficult to detect a low level defective pixel with this processing. It is also possible to set the defective pixel detection and judgment threshold value (C2) to an arbitrary value to change a defective pixel detection sensitivity under an arbitrary pickup condition (Step S25).

Next, the defect detection and judgment processing is performed, and it is possible to select either one of the third defect detection and judgment processing and the fourth defect detection and judgment processing depending on settings. The processings are described below.

The third defect detection and judgment is performed by using the same color filter peripheral level (B_same) and the defective pixel detection and judgment threshold value (C2) calculated in Step S25. The third defect detection and judgment condition is such that the noted pixel (the central pixel in the data reference region) is judged to be defective when the same color filter peripheral level (B_same) is smaller than the defective pixel detection and judgment threshold value (C2) (Step S26). The defective correction processing described below is performed when the noted pixel is judged to be defective.

In the case where the third defect detection and judgment condition is not satisfied in Step S26, the defect detection processing in the current data reference region is terminated to confirm whether or not (the processing in) the defect detection and correction region has been terminated (step S34).

In the case where the noted pixel (central pixel in the data reference region) has been judged to be defective in Step S26, the process proceeds to Step S27 to perform the fourth defect detection and judgment. The fourth defect detection and judgment is performed by monitoring the same color filter peripheral level (B_same), the defective pixel detection and judgment threshold value (C2) calculated in Step S25, and output states of the transmitting filters P(t−3), P(t−1), P(t+1), and P(t+3) which are different from the noted pixel in the data reference region.

The fourth defect detection and judgment condition is such that the noted pixel is judged to be defective when P(t−1) and P(t+1) are larger than P(t−3) and P(t+3) in the case where the same color filter peripheral level (B_same) is smaller than the defective pixel detection and judgment threshold value (C2) and P(t) is larger than P(t−4), P(t−2), P(t+2), and P(t+4) (or when P(t−1) and P(t+1) are smaller than P(t−3) and P(t+3) in the case where the same color filter peripheral level (B_same) is smaller than the defective pixel detection and judgment threshold value (C2) and P(t) is smaller than P(t−4), P(t−2), P(t+2), and P(t+4)) (Step S27). The defect correction processing described below is performed when the noted pixel is judged to be defective.

In the case where the fourth defect detection and judgment condition is not satisfied in Step S27, the defect detection processing in the current data reference region is terminated to confirm whether or not (the processing in) the defect detection and correction region has been terminated (Step S34).

Since the monitoring is performed on not more than the horizontal nine pixels in the third and the fourth defect detections and judgments as is the case in the defect detection and correction method of the first embodiment, an erroneous detection/correction of a vertical/oblique line may occur in the case where a letter or a line of a high resolution is picked up with a lens of a high resolution. Since each of the third and the fourth defect detections and judgments is different from the defect detection and correction method of the first embodiment, i.e. since this detection method enables to readily detect the defective pixel of high defective pixel level while having a difficulty in detecting the defective pixel of low defective pixel level, it is possible to detect a defective pixel exhibiting a high (low) level to the edge even when the defective pixel is near the edge (boundary between a high output and a low output).

In the third defect detection and judgment, unicolor (red, blue, or green) vertical and oblique lines can be erroneously detected/corrected, and, since the monitoring is performed only on the same color filters, a vertical line and an oblique line each of which is composed of plural colors, such as a white line, can be erroneously detected/corrected to be changed into a different color line. However, a flickering frequency of defective pixel near the edge is lowered with the third defect detection and judgment.

In the fourth defect detection and judgment, the unicolor vertical and oblique lines can be erroneously detected/corrected as is the case in the third defect detection and judgment. Though it is possible to avoid the erroneous detection/correction of the vertical and oblique lines each of which is composed of plural colors, such as a white line, the flickering frequency of defective pixel near the edge may be higher than that of the third defect detection and judgment.

In the case where it has been judged that the noted pixel is defective in the third and fourth defect detections and judgments in Steps S26 and S27, the process proceeds to Step S28 to monitor the output P(t) of the noted pixel which has been judged to be defective and output states of the four pixels (P(t−4), P(t−2), P(t+2), and P(t+4)) whose color of the color filter is the same as that of the noted pixel in the data reference region (Step S28).

Then, in the case where P(t) is larger (smaller) than the four pixels P(t−4), P(t−2), P(t+2), and P(t+4) and, at the same time, the two pixels P(t−2) and P(t+2) is larger (smaller) than P(t−4) and P(t+4) as is the output state 1 of FIG. 9, the defective pixel is corrected with a correction method of Steps S29 and thereafter which will be described later in this specification. In the case where the output state is not the output state 1 (in the case of the output state 2 of FIG. 10), the defective pixel is corrected with a correction method of Steps S35 and thereafter which will be described later in this specification.

In Step S29, the slope estimation correction amount (E2) is calculated in the case of the output state 1 of FIG. 9. The slope estimation correction amount (E2) is calculated by using the defect detection coefficient (X2) and the value P2'(t) obtained by estimating an output value of P(t) from a slope through points P(t−4) and P(t−2) and a slope through points P(t+4) and P(t+2), i.e., calculated as a value obtained by subtracting a sum of the defect detection coefficient (X2) and P2'(t) from P(t). The value P2'(t) is a value half of a sum of 2×(P(t−2)−P(t−4)) and 2×(P(t+2)−P(t+4)).

In the case of picking up vertical and oblique lines each having a high resolution, the noted pixel and filters of a color same as that of the noted pixel in the data reference region are in the output state 1. By reducing the correction amount of the vertical and oblique lines in the output state 1, it is possible to achieve an effect of reducing influences of the erroneous detection and correction of the vertical and oblique lines in an output image as well as an effect of suppressing a defective pixel flickering in an output image, which may occur due to alternating correction and non-correction processings on defective pixel in the case of an output state wherein the same color filter peripheral level (B_same) is substantially the same as the defective pixel detection and judgment threshold value (C2).

In Step S35, the threshold value supplementary correction amount (D2) is calculated in the case of the output state 2 of FIG. 10 (output states other than the output state 1 of FIG. 9). The threshold value supplementary correction amount (D2) is calculated by using the defective pixel detection and correction threshold value (C2) and the same color filter level (B_same), which is a difference value between the defective pixel detection and correction threshold value (C2) and the same color filter level (B_same).

By performing the arithmetic processing, it is possible to achieve an effect of suppressing a defective pixel flickering in an output image which may occur due to alternating correction and non-correction processings on defective pixel in the case of an output state wherein the same color filter peripheral level (B_same) is substantially the same as the defective pixel detection and judgment threshold value (C2).

Each of the two correction amounts (D2 and E2) is a value depending on the same color filter peripheral level (B_same) and the defective pixel detection and judgment threshold value (C2). Since the defective pixel detection and judgment threshold value (C2) depends on the defective pixel level (A) and the defect detection coefficient (X2), the two correction amounts are increased with increases in the defective pixel level of the defective pixel and the sensor gain, and the two correction amounts are reduced with reductions in the defective pixel level of the defective pixel and the sensor gain.

After the calculation of the two correction amounts, it is judged whether the noted pixel which has been judged to be defective is a high level defective pixel or a low level defective pixel to judge an orientation of correction of the noted pixel as shown in Steps S30 and S36 of FIG. 8, and then the correction shown in FIG. 8 is performed in Steps S31, S32, S37, and S38.

The arithmetic processing of Steps S31, S32, S37, and S38 is varied depending on the output state judged in Step S28 and the level of the noted pixel which has been judged to be the defective pixel in Steps S30 and 36.

In the case where the output state is the output sate 1 of FIG. 9 and the noted pixel is the high level defective pixel, the output value P2'(t) of defective pixel after correction is corrected to be a value obtained by subtracting the slope estimation correction amount (E2) from the output value P(t) of noted pixel (Step S31). In the case where the output state is the output sate 1 of FIG. 9 and the noted pixel is the low level defective pixel, the output value P2'(t) of defective pixel after correction is corrected to be a value obtained by adding the output value P (t) of noted pixel to the slope estimation correction amount (E2) (Step S32).

In the case where the output state is the output sate 2 of FIG. 10 (output states other than the output state 1) and the noted pixel is the high level defective pixel, the output value P2'(t) of defective pixel after correction is corrected to be a value obtained by subtracting the threshold value supplementary correction amount (D2) from the output value P(t) of noted pixel (Step S37). In the case where the output state is the output sate 2 of FIG. 7 and the noted pixel is the low level defective pixel, the output value P2'(t) of defective pixel after correction is corrected to be a value obtained by adding the output value P(t) of noted pixel to the threshold value supplementary correction amount (D2) (Step S38).

Next, in the same manner as in the Step S10 shown in FIG. 4, the output value P(t) of the noted pixel which has been judged to be the defective pixel is converted into the output value P2'(t) of defective pixel after defective pixel correction. The output value P2'(t) of defective pixel after defective pixel correction in the defect detection and correction processing of the second embodiment is corrected to a value ranging from the maximum value of P(t−4), P(t−2), P(t+2), and P(t+4) or to a value obtained by adding the defect detection coefficient (X2) and the same color filter peripheral level (B_same) to the maximum value to the utmost in the case where the defective pixel level is higher than those of the peripheral pixels P(t−4), P(t−2), P(t+2), and P(t+4). Also, in the case where the output value P(t) of defective pixel is lower than those of the peripheral pixels P(t−4), P(t−2), P(t+2), and P(t+4), the output value P2'(t) of defective pixel is corrected to a value ranging from the minimum value of P(t−4), P(t−2), P(t+2), and P(t+4) to a value obtained by adding the defect detection coefficient (X2) and the same color filter peripheral level (B_same) to the minimum value to the utmost.

After that, it is confirmed whether or not (the processing in) the defect detection and correction region has been terminated (Step S34). In the case where it is confirmed that (the processing in) the defect detection and correction region has not been terminated, the process returns to the Step S26 to perform the defect detection and correction processing on subsequent outputs. Upon termination of (the processing in) the defect detection and correction region, the defect detection and correction processing same as that described above is performed on a subsequent frame.

As described in the foregoing, according to the first and the second embodiments, the solid-state image pickup element provided with the defective detection and correction circuit 7 or 60 is capable of detecting a defective pixel and to correct a signal level of the defective pixel without using any storage unit for storing address data or the like of the defective pixel, and it is possible to suppress deterioration in image quality, such as flickering of the defective pixel and the like, by performing the processings according to an embodiment of this invention.

Also, a solid-state image pickup element provided with the defect detection and correction circuits of the first and the second embodiments is improved in convenience since the solid state image pickup element is not limited in the number of correctable defective pixels thanks to the absence of the storage unit such as a memory and is capable of correcting a defective pixel generated due to change with time after shipment.

It is possible to combine the defect detection and correction methods of the defect detection and correction circuit 7 of the first embodiment and the defect detection and correction circuit 60 of the second embodiment, so that an image sensor selects either one of the defect detection and correction methods of the first and the embodiments.

Further, a solid-state image pickup element CMOS image sensor provided with the defect detection and correction circuit 7 and/or the defect detection and correction circuit 60 detects and corrects a defective pixel at a defective pixel detection sensitivity and a defective pixel correction sensitivity which can be varied depending on a sensor exposure condition, and this invention enables: detection and correction of defective pixel without using a nonvolatile memory or the like for externally storing address data and the like of the defective pixel; a reduction in cost in the manufacturing stage; and detection/correction of a defective pixel generated after shipment.

Also, though an erroneous detection of judging a vertical line and an oblique line each having a high resolution to be a defective pixel may occur in the case where only horizontal pixels can be referred to in a CMOS image sensor which does not have a memory for plural arrays required for referring to both of horizontal and vertical pixels, an effect of suppressing a degree of the erroneous detection/correction is achieved by minimizing a correction amount of the defective pixel detection and correction processing of an embodiment of this invention. Also, it is possible to minimize flickering of a defective pixel due to a final output image by alternating correction and non-correction processings, which tends to occur when a level of the defective pixel is substantially the same as that of a defective pixel detection threshold value, by the correction processing of an embodiment of this invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image sensor comprising:
   a pixel unit including an effective pixel region and blanking regions and having a plurality of pixels each outputting a pixel signal, the blanking regions including optical black pixels and dummy pixels;
   an amplifier amplifying the pixel signals output from the pixel unit; and
   a defective pixel detection circuit performing a defective pixel detection on signals output from the amplifier,
   wherein,
   the defective pixel detection circuit adjusts the detection accuracy of the defective pixel detection in accordance with an exposure condition of the pixel unit.

2. The image sensor of claim 1, wherein the defective pixel detection circuit includes:
   (a) a dummy pixel calculation unit which calculates a dummy pixel noise level (D1) and identifies defective pixels;
   (b) a threshold detection unit which receives information from said dummy pixel calculation unit and calculates a peripheral level threshold value (C1) and a defective pixel level threshold value (E1);
   (c) a pixel level calculation unit which receives information from said threshold detection unit and monitors pixels along a horizontal line and calculates a defect pixel level (A), calculates a same color filter peripheral level (B_same) and a different color filter peripheral level (B_diff);
   (d) a first defect processing and judgment unit which receives information from said pixel level calculation unit and is effective to permit continued processing when B_same is less than C1 and A is greater than E1; and
   (e) a second defect processing and judgment unit which when permitted by said first defect processing and judgment unit is effective to permit continued processing when B_same is less than C1, B_diff is less than C1 and A is greater than E1.

3. The image sensor of claim 2, further including a correction circuit comprising:
   (a) a defect level calculation unit which when continued processing is permitted by said second defect processing and judgment unit, calculates a defective pixel correction level (F1); and
   (b) a defect correction unit which receives information from said defect level calculation unit corrects a defective pixel.

4. The image sensor unit of claim 1, further comprising:
   (a) a defect detection coefficient calculation unit which calculates a defective pixel detection coefficient (X2);
   (b) a reference pixel calculation unit which monitors a horizontal same color filter line and determines whether a central pixel in the monitored pixels is at a maximum or a minimum relative to the other pixels;
   (c) a pixel level calculation unit which calculates a defective pixel level (A) and a same color filter peripheral level (B_same);
   (d) a threshold value calculation unit which calculates a defective pixel detection and judgment threshold value (C2);
   (e) a third defect processing and judgment unit which permits processing to continue when C2 is greater than B_same;
   (f) a pixel distribution calculation unit which calculates a distribution of pixel levels in said monitored pixels;
   (g) a first defect correction amount calculation unit which, when the pixel distribution is sufficiently inverse U-shaped, calculates a correction amount (E2) and subtracts the amount E2 from the central pixel level if the central pixel level is sufficiently high, but otherwise adds the correction amount E2 to the central pixel level;
   (h) a second defect correction amount calculation unit which, when the pixel distribution is not sufficiently inverse U-shaped, calculates a threshold value supplementary correction amount (D2) subtracts the amount D2 from the central pixel level if the central pixel level is sufficiently high, but otherwise adds the correction amount D2 to the central pixel level; and
   (i) a defect correction unit which corrects defective pixels by replacing a pixel value with a correction value.

5. An image sensor comprising:

a pixel unit including an effective pixel region and blanking regions and including a plurality of pixels each outputting a pixel signal, the pixel unit setting an exposure period of the effective pixel region for each frame, the blanking regions including optical black pixels and dummy pixels;

an amplifier setting a gain for each of the frames and amplifying the pixel signals output from the pixel unit;

a defective pixel detection circuit detecting a defective pixel at a detection accuracy by referring to a noted pixel and reference pixels which are the pixel signals amplified by the amplifier; and a correction circuit referring to the noted pixel and the reference pixels which are the pixel signals amplified by the amplifier and correcting the pixel signal of the defective pixel detected by the defective pixel detection circuit, wherein the defective pixel detection circuit adjusts the detection accuracy of the defective pixel detection in accordance with an exposure condition of the pixel unit.

6. An image sensor comprising:

a pixel unit including an effective pixel region and blanking regions and having a plurality of pixels each outputting a pixel signal, the pixel unit setting an exposure period of the effective pixel region for each frame, the blanking regions including optical black pixels and dummy pixels;

an amplifier setting a gain for each of the frames and amplifying the pixel signal output from the pixel unit;

a defective pixel detection circuit referring to a noted pixel and reference pixels which are the pixel signals amplified by the amplifier and detecting a defective pixel; and a correction circuit referring to the noted pixel and the reference pixels which are the pixel signals amplified by the amplifier and correcting the pixel signal of the defective pixel detected by the defective pixel detection circuit, wherein the correction circuit adjusts an amount of the correction of the pixel signal of the defective pixel in accordance with an exposure condition of the pixel unit.

7. An image sensor comprising:

a pixel unit including an effective pixel region and blanking regions and having a plurality of pixels each outputting a pixel signal, the pixel unit setting an exposure period of the effective pixel region for each frame, the blanking regions including optical black pixels and dummy pixels;

an amplifier setting a gain for each of the frames and amplifying the pixel signal output from the pixel unit;

a defective pixel detection circuit referring to a noted pixel and reference pixels which are the pixel signals amplified by the amplifier and detecting a defective pixel at a detection accuracy; and a correction circuit referring to the noted pixel and the reference pixels which are the pixel signals amplified by the amplifier and correcting the pixel signal of the defective pixel detected by the defective pixel detection circuit, wherein the defective pixel detection circuit adjusts the detection accuracy of the defective pixel detection in accordance with an exposure condition of the pixel unit, and the correction circuit adjusts an amount of the correction of the pixel signal of the defective pixel in accordance with an exposure condition of the pixel unit.

8. An image sensor comprising:

a pixel unit including an effective pixel region and blanking regions and including a plurality of pixels each of which outputs a pixel signal, the blanking regions including optical black pixels and dummy pixels; and, a circuit portion that detects a defective pixel of said pixel unit;

wherein said circuit portion has a first detection accuracy corresponding to a first exposure condition of said pixel unit and a second detection accuracy corresponding to a second exposure condition of said pixel unit being deferent from the first exposure condition.

9. The image sensor according to claim 8, wherein the first detection accuracy is automatically replaced with the second detection accuracy when said pixel unit is switched from the first exposure condition to the second exposure condition.

10. The image sensor according to claim 8, wherein said circuit potion includes a correction circuit that corrects the pixel signal from the defective pixel under a first correction level corresponding to the first exposure condition and a second correction level corresponding to the second exposure condition.

11. A camera including:

a pixel unit including an effective pixel region and blanking regions and including a plurality of pixels each of which outputs a pixel signal, the blanking regions including optical black pixels and dummy pixels; and, a circuit portion that receives the pixel signal from said pixel unit and detects a defective pixel of said pixel unit;

wherein said circuit portion has a first detection accuracy corresponding to a first exposure condition of said pixel unit and a second detection accuracy corresponding to a second exposure condition of said pixel unit being deferent from the first exposure condition.

* * * * *